Figure 1:
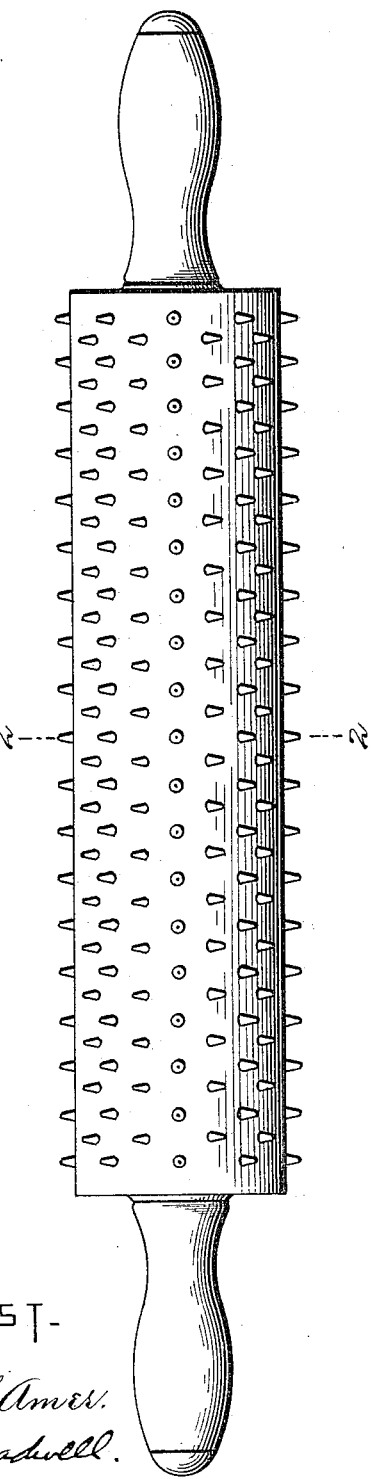

No. 819,772. PATENTED MAY 8, 1906.
W. LATHAM.
DOUGH KNEADING AND AERATING ROLLER.
APPLICATION FILED FEB. 9, 1906.

ATTEST-
Harry L. Ames.
B. F. Chadwell.

INVENTOR.
Woodville Latham
BY E. M. Marble
his ATTY.

UNITED STATES PATENT OFFICE.

WOODVILLE LATHAM, OF NEW YORK, N. Y.

DOUGH KNEADING AND AERATING ROLLER.

No. 819,772.         Specification of Letters Patent.         Patented May 8, 1906.

Application filed February 9, 1906. Serial No. 300,310.

*To all whom it may concern:*

Be it known that I, WOODVILLE LATHAM, a citizen of the United States, residing at the city of New York, in the county of New York and State of New York, have invented certain new and useful Improvements in Dough Kneading and Aerating Rollers, of which the following is a specification.

My invention relates to dough-kneading rollers; and it consists of a dough-kneading roller of a form which is hereinafter fully described, and clearly illustrated in the drawings appended to this application.

The objects of the invention are, first, a more thorough kneading of dough for bread, biscuit, or pie-crust than is possible with rollers such as have been used heretofore for this purpose; second, to provide simple and inexpensive means for introducing atmospheric air into dough, so as to make the dough sufficiently and uniformly "light" and so as to avoid occasion for the use of yeast or baking-powders in the making of bread.

The distinguishing peculiarity of my roller is that its surface is closely studded, toothed, or embossed or is coarsely roughened. In other words, it is covered with a multitude of points or protuberances. The action of this roller is to make a great many small indentations or cavities in the surface of a sheet of dough. When these have been made, if the sheet of dough be folded upon itself (indented surface inside) and the roller be again passed over the dough with suitable pressure the effect will be to seal up the air-filled cavities and to make a new set of indentations. By repeating this process over and over again more and more air is imprisoned within the dough, and not only so, but the air is uniformly distributed throughout the mass. There is no limit to the quantity of air that can be introduced in this way except that eventually because of the extreme tenuity of the cavity-walls the bursting of the air-cells under the pressure of the roller gives escape to as much air as a succeeding operation could add to the dough.

The roller of course can be made of various materials and of any required dimensions. If of small size, it may with small masses of dough have the general form of an ordinary rolling-pin and be operated by hand in connection with a bread-board, or it may be one of the elements of machinery for kneading and aerating dough on a large scale.

Figure 2:
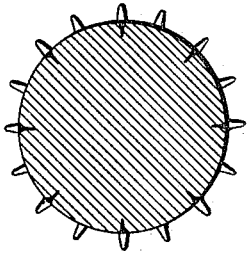

The Figures 1 and 2, representing the roller in the general shape of a rolling-pin, sufficiently illustrate the invention and can be readily understood without further explanation. The protuberances on the surface of the roller are preferably of conical form or else of the form of a truncated cone, because these easily enter the dough and are easily withdrawn without dragging the dough after them and clogging the spaces between them; but I do not limit myself in this respect.

Having thus described my invention, illustrated the same, and explained its operation, what I now desire to secure by Letters Patent is the following:

1. In a dough-kneading roller the combination with a plain-surfaced roller of protuberances or projecting pins, substantially as described.

2. As an article of manufacture, a dough kneading and aerating roller with a studded or toothed surface substantially as described.

In testimony whereof I have signed my name to this specification in the presence of two subscribing witnesses.

WOODVILLE LATHAM.

Witnesses:
    BLANCHE L. CHADWELL,
    MELVILLE E. DAYTON.